United States Patent [19]

Ferre et al.

[11] Patent Number: 5,063,524
[45] Date of Patent: Nov. 5, 1991

[54] METHOD FOR ESTIMATING THE MOTION OF AT LEAST ONE TARGET IN A SEQUENCE OF IMAGES AND DEVICE TO IMPLEMENT THIS METHOD

[75] Inventors: Alain Ferre, Cesson Sevigne; Christophe Chevance, Rennes; Jean Quignon, Crepy en Valois, all of France

[73] Assignees: Thomson-CSF, Puteaux, France

[21] Appl. No.: 433,790

[22] Filed: Nov. 9, 1989

[30] Foreign Application Priority Data

Nov. 10, 1988 [FR] France .................................. 88 14677

[51] Int. Cl.$^5$ .......................... G06F 15/70; H04N 5/14
[52] U.S. Cl. .................................... 364/516; 364/517; 382/28
[58] Field of Search ................ 364/516, 517; 358/105; 382/28, 43, 21, 27

[56] References Cited

U.S. PATENT DOCUMENTS

| | | | |
|---|---|---|---|
| 4,482,970 | 11/1984 | Barry | 364/517 |
| 4,490,851 | 12/1984 | Gerhart et al. | 382/28 |
| 4,829,342 | 5/1989 | Nishimura | 250/237 G |
| 4,845,610 | 7/1989 | Parvin | 364/516 |
| 4,868,385 | 9/1989 | Nishimura et al. | 250/237 G |

FOREIGN PATENT DOCUMENTS

| | | |
|---|---|---|
| 0226546 | 6/1987 | European Pat. Off. . |
| 0273518 | 7/1988 | European Pat. Off. . |
| WO8705769 | 9/1987 | PCT Int'l Appl. . |
| 2100423 | 12/1982 | United Kingdom . |
| 2187059 | 8/1987 | United Kingdom . |

Primary Examiner—Salvatore Cangialosi
Attorney, Agent, or Firm—Oblon, Spivak, McClelland, Maier & Neustadt

[57] ABSTRACT

The disclosed method consists in:
method for estimating the motion of at least one target in a sequence of images, including: coefficients transformed by the Fourier transform;
computing a matrix called a phase correlation matrix, each coefficient of which is equal to the product of a transformed coefficient of a first image, by the conjugate of a homologous transformed coefficient of a second image, divided by the square of the modulus of this product;
computing an inverse transformed matrix of the phase correlation matrix, in applying the inverse Fourier transform;
searching, among the coefficients of the inverse transformed matrix, for those coefficients having the greatest moduli;
then estimating a translation vector for each target and a translation vector of the image background, on the basis of the order of the row and of the order of the column in which there are respectively located the coefficients having these greatest moduli.

3 Claims, 2 Drawing Sheets

METHOD FOR ESTIMATING THE MOTION OF AT LEAST ONE TARGET IN A SEQUENCE OF IMAGES AND DEVICE TO IMPLEMENT THIS METHOD

BACKGROUND OF THE INVENTION

1. Field of the Invention

The present invention concerns a method for estimating the motion of at least one target in a sequence of images, the motion of this target and the motion of the background of the images being comparable to translations. The estimation of the motion of a target enables the detection and tracking of this target, despite the motion of the background of the images due to the shifting of the vehicle carrying the image sensor, and despite the shifting of the target in relation to the background of the images.

2. Description of the Prior Art

The detection and tracking of a target can be done according to two known methods:

either the target is modelized and attributes defining it are computed. The detection then making a search, in the image, for a zone defined by attributes of little difference compared with those of the target;

or the target is defined as being a zone of pixels in motion between a reference image and the current image.

These two methods can be used independently or simultaneously. When the attributes proper to the target cannot be determined on an a priori basis, the second method is implemented. It necessitates, first of all, the resetting of the background of the current image in relation to the background of the reference image. It then consists in extracting the target in computing the differences in luminance between the reference image and the current image after the resetting of its background. The pixels having a difference in luminance that is greater than a fixed threshold value are considered to have a true motion, due to the presence of a target in motion, while the pixels having a difference in luminance below the threshold value are considered to have a motion due to noise.

In practice, the images are often greatly noise-infested, for example because they are supplied by infrared image sensors. The noise makes it difficult to estimate the background motion as well as to detect and estimate the motion of one or more targets.

C. B. KUGLIN and D. C. HINES give a description, in IEEE 1975, *International Conference on Cybernetics and Society*, San Francisco 1975, of a method for estimating the translation motion of the background in a sequence of images using a phase correlation. It consists in sampling the current image and the background image, computing, for each of these two images, a matrix of coefficients transformed by the two-dimensional discrete Fourier transform, computing a so-called phase difference matrix, each coefficient of which is equal to the product of a coefficient of the first matrix by the conjugate of a coefficient of a second matrix divided by the modulus of this product, computing a matrix called an inverse transformed matrix of the phase correlation matrix, applying the inverse Fourier transform to the phase correlation matrix, classifying the coefficients of the inverse transformed matrix according to their modulus, estimating a vector of translation of the background of the images on the basis of the order of the row and the order of the column in which there is located the coefficient having the greatest modulus in the inverted transformed coefficient of the phase correlation matrix.

SUMMARY OF THE INVENTION

The aim of the invention is to propose a method enabling not only an estimation of the motion of the background of images but also the detection and estimation of one or more targets in these images.

The object of the invention is a method consisting essentially in using the information given by the modulus of coefficients, of the inverse transformed matrix of the phase correlation matrix, other than those having the greatest modulus.

According to the invention, there is proposed a method for estimating the motion of at least one target in a sequence of images, the motion of this target and the motion of the background of the images being comparable to translations, said method consisting in the steps of:

sampling each image, then representing each sample by the value of its luminance;

computing, for each image, a matrix of coefficients transformed by the two-dimensional discrete Fourier transform;

computing a matrix called a phase correlation matrix, each coefficient of which is equal to the product of a transformed coefficient of a first image, by the conjugate of a homologous transformed coefficient of a second image, divided by the square of the modulus of this product;

computing a matrix, called an inverse transformed matrix of the phase correlation matrix, in applying the inverse Fourier transform to the phase correlation matrix;

making a comparison, with a predetermined threshold value, of the coefficients of the inverse transformed matrix of the phase correlation matrix and searching for that coefficient which has the greatest modulus, this coefficient corresponding to a translation of the image background, while the other coefficients having a modulus greater than the value of the threshold correspond to possible targets;

then estimating a translation vector for each possible target and a translation vector of the image background, in a reference position related to the first image, on the basis of the order (x) of the row and of the order (y) of the column in which there is located the coefficient corresponding respectively to each target and to the background of the image, in the inverse transformed matrix of the phase correlation matrix;

resetting the background of the first image in relation to the background of the second image, as a function of the translation vector estimated for the background;

computing the absolute values of the differences in luminance between the first image, the background of which has been reset, and the second image, these values of differences in luminance constituting an image called a difference image;

comparing the absolute values of the differences in luminance with a predetermined threshold value; each pixel with a difference in luminance greater than the threshold value being considered as a pixel in motion;

attributing each pixel in motion to a zone formed by pixels that are in motion and are adjoining;

computing a speed vector for each zone, in computing a vector of translation of this zone from a first difference image to a second difference image;

computing a speed vector for each target, as a function of the translation vector estimated for this target and as a function of translation vector estimated for the image background;

concluding that a zone belongs to a target when its speed vector coincides with the speed vector of a target.

DESCRIPTION OF PREFERRED EMBODIMENTS

The method according to the invention consists firstly in sampling each image of the sequence of images analyzed by a sensor, and in representing each sample by the value of its luminance. For example, each image is sampled in 256×256 pixels, by means of a standard image sensor. The method then consists in computing, for each image, a matrix of coefficients transformed by the two-dimensional discrete Fourier transform. The values of the transformed coefficients $F(u,v)$ are given by the following formula:

$$F(u,v) = \frac{1}{N1} \frac{1}{N2} \sum_{x=0}^{N1} \sum_{y=0}^{N2} f(x,y) \cdot e^{-j2\pi \cdot (\frac{ux}{N1} + \frac{v.y}{N2})} \quad (1)$$

where $f(x,y)$ is the luminance value of the pixel having coordinates $(x,y)$ in a reference system of coordinates oxy centered, for example, in the upper left-hand corner of the image which is the starting point of the analysis; where N1 and N2 are respectively the number of pixels per row and the number of rows considered for the Fourier transform. In one example of implementation, the image is sub-sampled before the Fourier transform. For example, N1=N2=128. This amounts to taking one in every two samples in a row, and in taking only one in every two rows, to enable the computations to be done in real time.

It is shown that each transformed coefficient of a current image, shifted by a translation $(xd, yd)$ in $$FD(u,v) = \frac{1}{N1} \frac{1}{N2} \sum_{x=0}^{N1} \sum_{y=0}^{N2} f(x + xd, y + yd) \cdot e^{-j2\pi \cdot [\frac{u(x+xd)}{N1} + \frac{v(y+yd)}{N2}]} \quad (2)$$

$$= F[u,v] \cdot e^{-j2\pi \cdot [\frac{u.xd}{N1} + \frac{v.yd}{N2}]} \quad (3)$$

o

The translation therefore takes the form, in the Fourier space, of a phase shift which is a function of the components of the translation vector. It is also shown that this phase shift may be computed by the following formula:

$$CP(u,v) = e^{-j2\pi \cdot [\frac{u.xd}{N1} + \frac{v.yd}{N2}]} = \frac{FD(u,v) \cdot F^*(u,v)}{|FD(u,v) \cdot F^*(u,v)|} \quad (4)$$

It must be noted that the denominator is also equal to: $|FD(u,v).F^*(u,v)|$ and to $|FD(u,v)|^2$.

The matrix formed by the coefficients $CP(u,v)$ is called a phase correlation matrix. It comprises 128×128 coefficients in this example.

The method according to the invention consists in computing the phase correlation matrix for the current image and the reference image, and then consists in computing the inverse transformed matrix of the phase correlation matrix by applying the two-dimensional inverse Fourier transform. Then it consists in computing the modulus of each of the coefficents $C(x,y)$ of this inverse transformed matrix, and in classifying these coefficients according to decreasing order of moduli.

Figure 1:
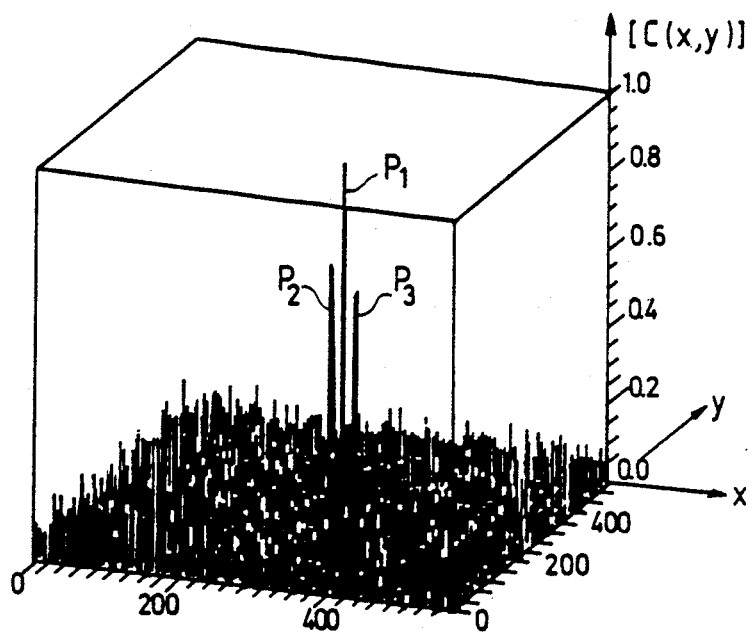
FIG. 1 shows the graph of the moduli of the coefficients of the inverse transformed matrix of of a phase correlation matrix, for an example of images.

FIG. 1 shows the graph of the moduli of the coefficients $C(x,y)$ in an example where the current image and the reference image have two targets in translation in relation to the background. This graph has three peaks P1, P2, P3 corresponding to three coefficients, the moduli of which are far greater than the moduli of the other coefficients. The peak with the greatest amplitude, P1, corresponds to the shifting of the background of the current image in relation to the reference image. The second peak, in decreasing order of moduli, P2, corresponds to a large-sized target, shifting in relation to the background of the reference image. The third peak, in decreasing order of moduli, P3, is smaller than the peak P2 and corresponds to a target that has an apparent size smaller than the previous one and is shifting in relation to the background of the reference image. The other peaks are appreciably smaller in size and correspond to noise.

The coordinates $(x,y)$ of each of these peaks P1, P2, P3 enable a translation vector to be estimated. The coordinates of the peak P1 enable an estimation of a translation vector of the background of the current image in relation to the background of the reference image, this vector enabling a resetting of the background of the current image. The coordinates of the peaks P2 and P3 make it possible to estimate, respectively, two translation vectors which characterize the motion of two distinct targets in relation to the background of the reference image. Since the translation of the background between the reference image and the current image is known, these two translation vectors enable an absolute speed vector to be determined for each target.

The matrix of the moduli of the coefficients $C(x,y)$ comprises 128×128 discrete values, corresponding to the sub-sampling of 128×128 pixels. This number of values does not make for very great precision in the determining of the components of the translation vectors. The method, therefore, preferably consists in making an interpolation to improve the estimation of the translation vectors.

Figure 2:
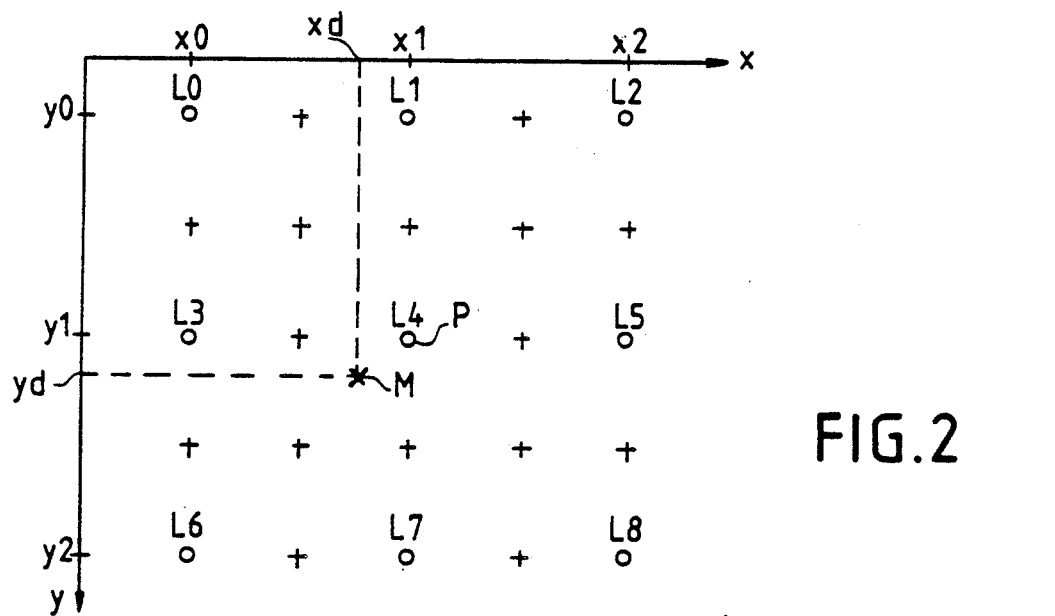
FIGS. 2 and 3 illustrate two steps of the implementation of the method according to the invention.

FIG. 2 illustrates the interpolation method used to estimate the components of each translation vector. For each peak P, having a modulus L4 and coordinates (x1, y1), the method consists in considering the moduli of the coefficients C(x, y) located in a window centered on the coordinates (x1, y1) point, this window having dimensions such that they contain nine coefficients. In view of the sub-sampling which takes into account only one in every two points horizontally and one in every two points vertically, the dimensions of the window are 5×5 pixels. In this window, the values of the modulus which are known are: L0, L1, L2 on a first row with a y-axis reference y0, L3, L4, L5 on a second row with a y-axis reference Y1=y0+2; L6, L7, L8 on a third row with a y-axis reference y2=y0+4. The moduli with values L0, L3, L6 are located on the x-axis point x0. The moduli with values L1, L4, L7 are located on the x-axis point x1=x0+2. The moduli with values L2, L5, L8 are located on the x-axis point x2=x0+2.

The graph of the modulus of the coefficients C(x,y) is a two-dimensional surface which is known only by discrete points spaced out at a distance corresponding to a pixel. The peaks P, found among the moduli of the coefficients C(x,y) therefore do not correspond exactly to the real peaks M of the graph. The coordinates (xd, yd) of the true maximum M of the graph of the modulus are estimated by the following interpolation formulae:

$$xd = \frac{1}{9} \sum_{i=0}^{8} Li \cdot xi$$
$$yd = \frac{1}{9} \sum_{i=0}^{8} Li \cdot yi$$
(5)

The method consists in then resetting the background of the current image in relation to the background of the reference image, as a function of the translation vector estimated for the background of the current image, and corresponding to the peak of the greatest modulus P1. Since the components of the translation vector are generally non-integral values, the resetting of the background of the current image is done by means of a known interpolation method, called a bilinear interpolation method.

Figure 3:
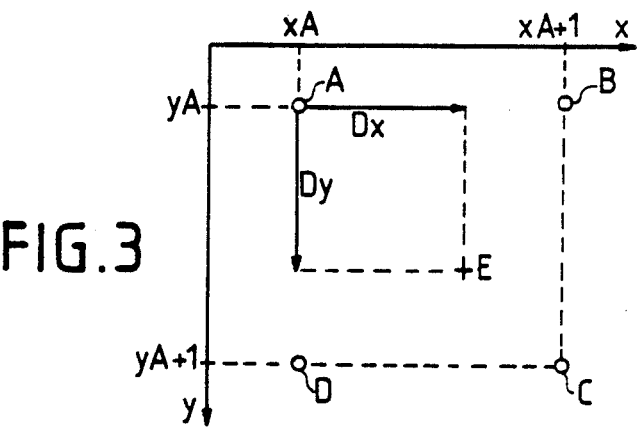

FIG. 3 illustrates this method of interpolation. The pixel of the reset image is centered on the point E, the coordinates of which are (xA+Dx, yA+Dy), Dx and Dy being between 0 and 1 pixel. The point E is located between four points A, B, C, D which are the centers of pixels where the luminance value is known. These points respectively have coordinates (xA,yA), (xA+1,yA) (xA,-yA+1), (xA+1,yA+1). The luminance value interpolated at the point E is then given by the formula:

$$L(xA + Dx, yA + Dy) = (1 - Dx) \cdot (1 - Dy) \cdot L(xA, yA) + Dx \cdot (1 - Dy) \cdot L(xA + 1, yA) + Dx \cdot Dy \cdot L(xA + 1, yA + 1) + (1 - Dx) \cdot Dy \cdot L(xA, yA + 1)$$
(6)

The targets detected by the peaks P2 and P3 are only possible targets, for the noise generates false alarms. It is necessary to ascertain, by other means, that these possible targets are not noise. Furthermore, the position of these targets in the current image remains to be determined, in order that they may be tracked.

To validate a target among all the zones in motion in the current image, the method then consists in computing the values of the differences in luminance between the reset current image and the reference image. The entire set of these values is called a "difference image". The non-zero differences in luminance are either due to a shifting of a target in relation to the background of the current image, or due to noise which is very great in the case of an infra-red image, or again due to imperfections in the sensor, resulting in a mean response that is unequal from one row to another.

To remedy the inequality of the responses of the sensor from one row to another, the method consists in the performance, before the computation of the difference in luminance, of a so-called rows equalization operation. This equalization consists in subtracting, from each luminance value of an image, the mean value of the luminances of the row to which the pixel considered belongs. The mean value of luminance on each row is then equal to zero. It should be noted that there are other known methods to achieve an equalization of the responses given by the different rows of a sensor. The method according to the invention is not restricted to the above-described equalization method.

The method according to the invention then consists in making a first discrimination of the targets by comparing the absolute value of each difference in luminance with a fixed threshold value. The pixels having a difference in luminance greater than the threshold value are considered to have a true motion while the others are considered to be fixed and to be noise-affected. The threshold value is fixed as a function of the false alarm rate which is tolerable.

In practice, this discrimination is not sufficient to get rid of most of the false alarms due to noise. An additional step of the method consists in grouping the pixels which have a difference in luminance greater than the threshold value, in zones of adjoining pixels, each zone being identified by a number and being characterized by a status vector. This status vector has many components:

the number of pixels forming the zone;

the coordinates of the barycenter of these pixels;

the mean absolute value of the differences in luminance in the zone;

the maximum coordinates of the pixels of the zone, these coordinates enabling the definition of a frame surrounding the possible target.

The attribution of the pixels, as and when a scan is made of the difference image, leads to the creation of new zones, or to the extension of existing zones, or to the merging of a zone with another one which proves to be adjoining. Each of the operations on these zones leads to an updating of the components of the status vector of the zones. For example, when a pixel having a luminance value greater than the threshold value adjoins two already encountered zones, it is attributed to a zone resulting from the merger of these two zones. The status vector of the resultant zone is determined as a function of the status vectors of the two zones which are merged. The pixels can be attributed to zones according to different recursive methods. A known method is described in the French patent application No. 2 599 205.

A second step in the discrimination of the targets may consist in declaring that a zone is a target, and not noise, if the number of pixels forming this zone is greater than a second fixed threshold value. But this discrimination should not prevent the detection of the targets which are at the limit of the range of visibility.

A third target discrimination step may consist in estimating a speed vector for each of the zones of pixels in motion, by a known method, and then in comparing the modulus of the speed vector thus estimated with the modulus of the speed vector computed from the translation vector corresponding to each of the peaks detected in the inverse transformed matrix of the phase correlation matrix. The coincidence between the modulus of the speed vector of a zone, or of several separated zones, with the modulus of the speed vector corresponding to one of the previously detected peaks, with the exception of the peak corresponding to the image background, makes it possible to conclude that there is a target having this speed.

The estimation of the speed vector of each zone may be done according to a known method, described in the patent application No. GB 2.134.344.

It sometimes happens that a target takes the form of several zones that are separated but have the same speed. This is the case, for example, of a target which comprises several hot points and is observed by means of a sensor of infra-red images. In a case such as this, the method has the advantage of identifying the plurality of zones in motion as being a single target, whereas a discrimination using only the comparison of difference in luminance with a threshold cannot be used to ascertain that this plurality of zones belongs to one and the same target, since the difference image shows nothing in the space between these different zones, once all the smallest differences in luminance have been removed after comparison with the threshold value.

To further improve the discrimination of the targets with respect to the noise, it is advantageous to test the temporal continuity of the shifting of a target in the sequence of images. A target is then validated if the distance that it travels between a reference image and a current image is smaller than a maximum shift computed as a function of a speed value deduced from a detected peak, and as a function of the time between the two images. This method may be improved by validating a target only if the temporal continuity is observed during a number of successive images, greater than a fixed value. The counting of the observations is reset at zero whenever the target is not found in an image.

The sequence of images analyzed by the sensor gives rise to the computation of a sequence of inverse transformed matrices of the phase correlation matrix. In this sequence of matrices, the target peak is also found with a remarkable temporal continuity that also enables the discrimination of the peak of the targets from the unwanted peaks, in validating a target peak only if the temporal continuity of its coordinates is observed during a number of images greater than a fixed value.

The method according to the invention may be implemented in real time, in particular if each image is sub-sampled at dimensions of 128×128 pixels to make the computations faster.

Figure 4:
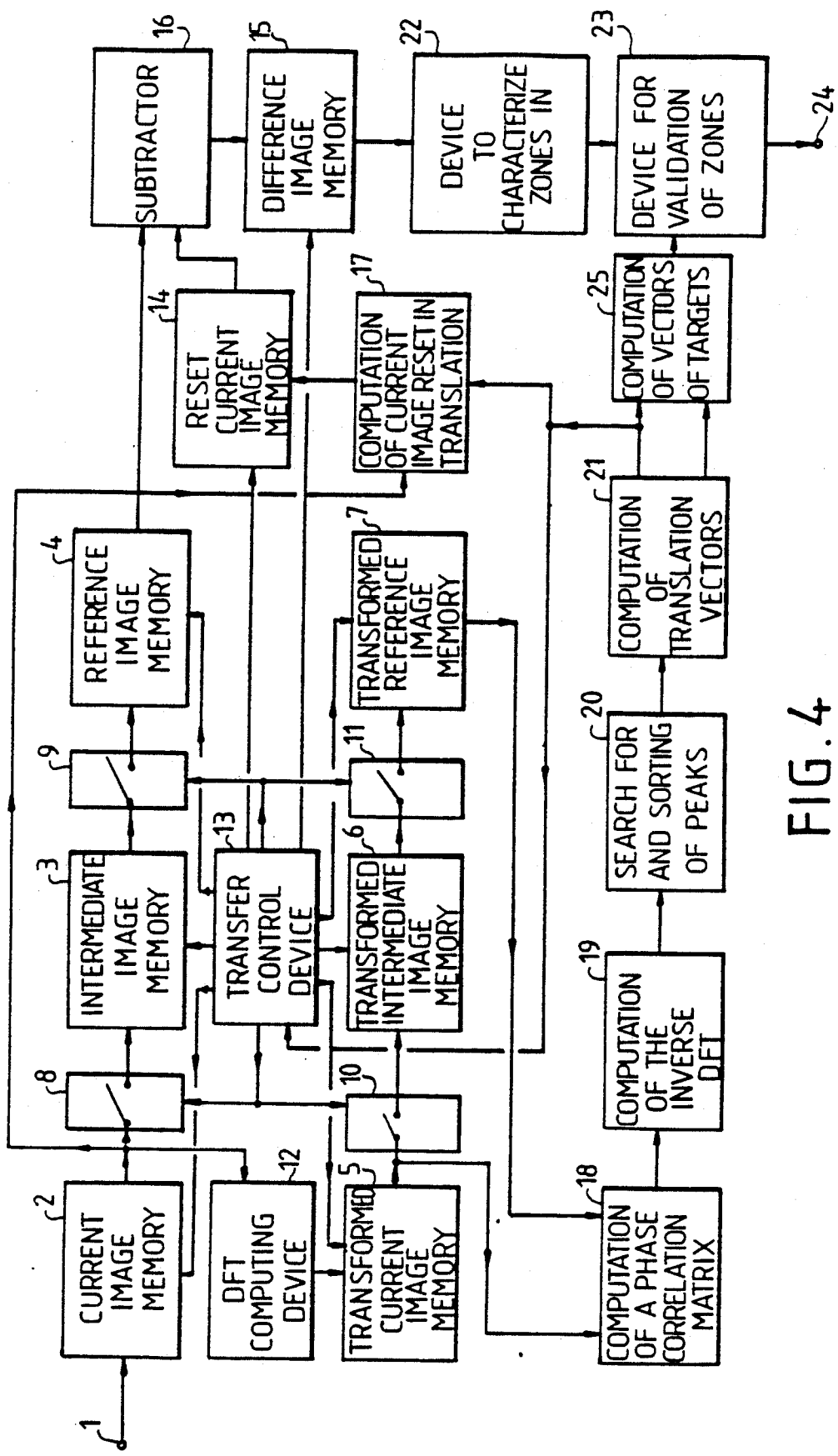
FIG. 4 shows a block diagram of an exemplary embodiment of a device for the implementation of the method according to the invention.

FIG. 4 shows a block diagram of an exemplary embodiment of a device for the implementation of this method. This exemplary embodiment comprises: an input terminal 1 receiving a sequence of luminance values given by an image sensor, a sampler and a device for the equalization of the rows, not shown in the figure; image memories 2, 3, 4 to respectively store a current image, an intermediate image and a reference image; memories 5, 6 and 7 to store, respectively, the transformed coefficients of the current image, the intermediate image and the reference image, transformed by the two-dimensional discrete Fourier transform; switch-over devices 8, 9, 10, 11; a device 12 for computing the two-dimensional discrete Fourier transform; a device 13 for controlling transfers, an image memory 14 to store the reset current image, an image memory 15 to store a difference image, a subtractor 16, a device 17 to compute the current image reset in translation, a device 18 to compute a phase correlation matrix, a device 19 to compute the two-dimensional inverse discrete Fourier transform, a device 20 to seek and sort out correlation peaks, a device 21 to compute translation vectors, a device 22 to characterize zones in motion, a device 23 for validating zones, a device 25 to compute the speed vectors of the targets and an output terminal 24 giving data characterizing the validated targets.

The device 13 for controlling transfers has: an output connected to a control input of the switch-over devices 8 and 10; an output connected to a control input of the switch-over devices 9 and 11, and outputs respectively connected to reading and writing inputs, memories 2 to 7 and memories 14 and 15. The memories 3 and 6 are controlled in parallel simultaneously. The memories 4 and 7 are controlled in parallel simultaneously.

The input terminal 1 is connected to a data input of the memory 2. A data output of the memory 2 is connected to a first input of the device 17, to an input of the device 12 and to an input of the switch-over device 8. An output of the device 8 is connected to a data input of the memory 3. A data output of the memory 3 is connected to a data input of the memory 4 by means of the switch-over device 9. A data output of the memory 4 is connected to a first input of the subtractor 16. An output of the device 12 is connected to a data input of the memory 5 to give it the values of the transformed coefficients of the current image.

The device 12 computes the two-dimensional discrete Fourier transforms of the luminance values of the current image, sub-sampled at 256×256 pixels. It implements a standard algorithm such as the Forman's algorithm. A data output of the memory 5 is connected to a data input of the memory 6 by means of the switch-over device 10. A data output of the memory 6 is connected to a data input of the memory 7 by means of the switch-over device 11.

The device 13 has an input connected to an output of the device 21 to receive the value of the components of the translation vector of the background of the current image in relation to the background of the reference image. When the absolute value of one of the components of this vector is greater than 10, the device 13 commands the switch-over device 9 and the memories 3 and 4 to transfer the luminance values of the intermediate image, stored in the memory 2, towards the memory 4, to form a new reference image. Simultaneously, the device 13 commands the switch-over device 11 and the memories 6 and 7 to transfer the transformed coefficients of the intermediate image, stored in the memory 6, to the memory 7, so that they constitute the transformed coefficients of a new reference image.

When the absolute value of one of the components of the translation vector of the background of the current image in relation to the background of the reference image is greater than or equal to five pixels, the device 13 commands the switch-over device 8 and the memories 2 and 3 to transfer the luminance values of the current image, stored in the memory 2, to the memory 3, to constitute the luminance values of a new intermediate image. Simultaneously, the device 13 commands the switch-over device 10 and the memories 5 and 6 to transfer the transformed coefficients corresponding to the current image, stored in the memory 5, to the memory 6, to form the transformed coefficients of an intermediate image.

When the components of the translation vector of the background of the current image in relation to the background of the reference image fulfil neither of these two conditions, the device 13 makes no transfer into the memories 3 and 4 or into the memories 6 and 7. On the other hand, it continues to see to the storage of the luminance values in the memory 2 to refresh the current image, and to see to the storage, in the memory 5, of the transformed coefficients corresponding to each new current image.

The computing device 18 has a first input connected to the data output of the memory 5, a second input connected to the data output of the memory 7 and an output connected to an input of the computing device 19. An output of this computing device 19 is connected to an input of the device 20. The device 21 has: an input connected to an output of the device 20, a first output connected to a first input of the device 25 and a second output connected to an input of the device 13, to a second input of the device 17 and to a second input of the device 25. An output of the device 17 is connected to a data input of the memory 14. A data output of the memory 14 is connected to a second input of the subtractor 16. A reading-writing control input of the memory 14 is connected to an output of the device 13.

The memory 15 has: a data input connected to an output of the subtractor 16; a control input connected to an output of the device 13; and an output connected to an input of the device 22. The device 23 has: a first input connected to an output of the device 22, a second input connected to an output of the device 25 and an output connected to the output terminal 24.

The computing device 18 computes each coefficient of the phase correlation matrix in accordance with the above-mentioned formula (4). The device 19 computes the two-dimensional inverse discrete Fourier transform of the phase correlation matrix according to a standard algorithm such as the Forman algorithm.

The computing device 20 computes the modulus of each of the coefficients of the inverse transform matrix of the phase correlation matrix, compares it with a threshold value that is fixed above the threshold of the noise so as to detect the coefficients corresponding to the translation of a target, and makes a search, among these coefficients, for the one having the greatest modulus. This coefficient corresponds to the translation of the background of the image in relation to the reference image. The computing device 21 determines the precise coordinates of the correlation peaks by a correlation in accordance with the formula (5). These coordinates respectively form the components of a translation vector for the background image and a translation vector for each of the targets.

The second output of the device 21 gives the components of a background translation vector, firstly to the transfer control device 13 and, secondly, to the computing device 17 to compute the luminance values of the current image reset in translation. The device 17 computes these luminance values according to the formula 6, as a function of the luminance values of the current image read in the memory 2 under the control of the device 13. The luminance values of the reset current image are stored in the image memory 14, under the control of the device 13. Besides, the second output of the device 21 gives the components of the translation vector of the background to the second input of the device 25, while the first output of the device 21 gives the components of the translation vectors of the targets to the first input of the device 25. These components are defined in relation to a reference system related to the reference image. The computing device 25 computes the difference between each translation vector of a target and the translation vector of the background of images, to obtain a translation vector defined in an absolute reference system. Then it computes a speed vector for each target in dividing its translation vector by the duration between the current image and the reference image.

The subtractor 16 computes the absolute values of the differences in luminance between the reset current image and the reference image. Then these values of differences are stored in the difference image memory 15 under the control of the device 13. The device 22 for characterizing the zones in motion compares the luminance difference values with a predetermined threshold value. Each pixel for which the absolute value of the difference in luminance is greater than the threshold value is considered to be in true motion. The other pixels are either fixed or affected by the noise. The device 22 attributes each pixel in motion to a zone formed by pixels that are in motion and are adjoining. Each zone that has a number of pixels greater than a fixed threshold value is liable to represent a target.

For each zone that is liable to represent a target, the device 22 computes a speed vector on the basis of the translation of the barycenter of this zone from a first difference image to a second difference image, the first difference image being a difference image computed previously for a previous reference image and a previous current image, this first difference image being kept in memory in the device 22. The second difference image is formed by the difference image stored in the memory 15. For each zone liable to be a target, the device 22, firstly, gives the zone validating device 23 a zone number enabling the characteristics of this zone to be recovered in a status vector memory within the device 22 and, secondly, gives it the components of a speed vector, estimated for this zone from the translation of this zone from the first difference image to the second difference image.

At its second input, the device 23 further receives the components of the speed vectors of the targets, computed by the device 25. The device 23 searches for the coincidence between the modulus of the speed vector of each zone and each of the moduli of the target speed vectors. For this purpose, it respectively compares the modulus of the speed vector of a zone with the modulus of the speed vector of each target, and does with a predetermined margin of tolerance. When the device 23 detects a coincidence, it concludes that the zone considered belongs to the target having the speed considered. It gives the output terminal 24 a piece of information consisting of the number of the validate zone, or the numbers of the validated zones, with the components of the speed vector corresponding to this zone, or to these zones.

This number can be used in another image processing device to sort out the zones belonging to a given target in the current image, and to surround them with a box so as to display them on a screen, and to get rid of the zones that belong to no target and are probably due to noise.

The device 22 for characterizing the zones in motion can be made in accordance with the teaching of the GB patent application No. 2 134 344. The devices for computing the Fourier transform, 12 and 19, may be specialized integrated circuits available in the market, such as the VFP325 type circuit marketed by ZORAN. The other memory devices or computing devices are of sufficiently standard fabrication to be within the range of those skilled in the art.

The invention can be applied notably to multiple-target detection in infra-red, visible or radar images when the shifts can be compared to translations.

What is claimed is:

1. A method for estimating the motion of at least one target in a sequence of images, the motion of this target and the motion of the background of the images being comparable to translations, said method consisting in the steps of:

sampling each image, then representing each sample by the value of its luminance;

computing, for each image, a matrix of coefficients transformed by the two-dimensional discrete Fourier transform;

computing a phase correlation matrix, each coefficient of which is equal to the product of a transformed coefficient of a first image, by the conjugate of a homologous transformed coefficient of a second image, divided by the square of the modulus of this product;

computing an inverse transformed matrix of the phase correlation matrix, in applying the inverse Fourier transform to the phase correlation matrix;

making a first comparison, with a predetermined threshold value, of the coefficients of the inverse transformed matrix of the phase correlation matrix and searching for that coefficient which has the greatest modulus, this coefficient corresponding to a translation of the image background, while the other coefficients having a modulus greater than the value of the first threshold correspond to possible targets;

then estimating a translation vector for each possible target and a translation vector of the image background, in a reference position related to the first image, on the basis of the order (x) of the row and of the order (y) of the column in which there is located the coefficient corresponding respectively to each target and to the background of the image, in the inverse transformed matrix of the phase correlation matrix;

resetting the background of the first image in relation to the background of the second image, as a function of the translation vector estimated for the background;

computing the absolute values of the differences in luminance between the first image, the background of which has been reset, and the second image, these values of differences in luminance constituting an image called a difference image;

comparing the absolute values of the differences in luminance with a second predetermined threshold value; each pixel with a difference in luminance greater than the second threshold value being considered as a pixel in motion;

attributing each pixel in motion to a zone formed by pixels that are in motion and are adjoining;

computing a speed vector for each zone, in computing a vector of translation of this zone from a first difference image to a second difference image;

computing a speed vector for each target, as a function of the translation vector estimated for this target and as a function of translation vector estimated for the image background;

concluding that a zone belongs to a target when its speed vector coincides with the speed vector of a target.

2. A method according to claim 1 wherein, to eliminate false detections of targets, it further consists in checking that the modulus of the speed vector of each zone is smaller than a fixed threshold value for a duration corresponding to fixed number of images.

3. A device for estimating the motion of at least one target in a sequence of images, comprising:

means for sampling each image and representing each sample by the value of its luminance;

means for computing for each image, a matrix of coefficients transformed by a two-dimensional discrete Fourier transform;

means for computing a matrix called a phase correlation matrix, each coefficient of which is equal to the product of a transformed coefficient of a first image, by the conjugate of a homologous transformed coefficient of a second image, divided by the square of the modulus of this product;

means for computing an inverse transformed matrix of the phase correlation matrix, in applying an inverse Fourier transform to the phase correlation matrix;

means for making a comparison, with a first predetermined threshold value, of the moduli of the coefficients of the inverse transformed matrix of the phase correlation matrix and to search for that coefficient which has the greatest modulus, this coefficient corresponding to a translation of the image background, while other coefficients having a modulus treater than the value of the threshold correspond to possible targets;

means for estimating a translation vector for each possible target and a translation vector for the image background on the basis of the order of the row and of the order of the column in which there is located the coefficient corresponding respectively to each possible target and to the background of the image, in the inverse transformed matrix of the phase correlation matrix;

means for resetting the background of the first image in relation to the background of the second image, as a function of the translation vector estimated for the background;

means for computing absolute values of differences in luminance between the first image, the background of which has been reset, and the second image, these values of differences in luminance constituting a difference image;

means for comparing the absolute values of the differences in luminance with a second predetermined threshold value, each pixel with a difference in luminance greater than the second threshold value being considered as a pixel in motion, and for attributing each pixel in motion to a zone formed by pixels that are in motion and are adjoining, each zone being capable of representing a target;

means for validating each zone that belongs to a target by:

computing a speed vector for each zone, by estimating a vector of translation of this zone from a first difference image to a second difference image;

computing the modulus of the speed vector for each possible target, on the basis of the translation vector of this possible target and of the translation vector of the background, estimated on the basis of the inverse transformed matrix; and concluding that a zone truly belongs to a target if the modulus of the speed vector estimated for this zone coincides with the modulus of the speed vector estimated for a possible target.

* * * * *